(No Model.) 4 Sheets—Sheet 3.
T. CLARKE, W. H. PAULDING & G. REINL.
SLEEPING CAR.
No. 294,331. Patented Feb. 26, 1884.
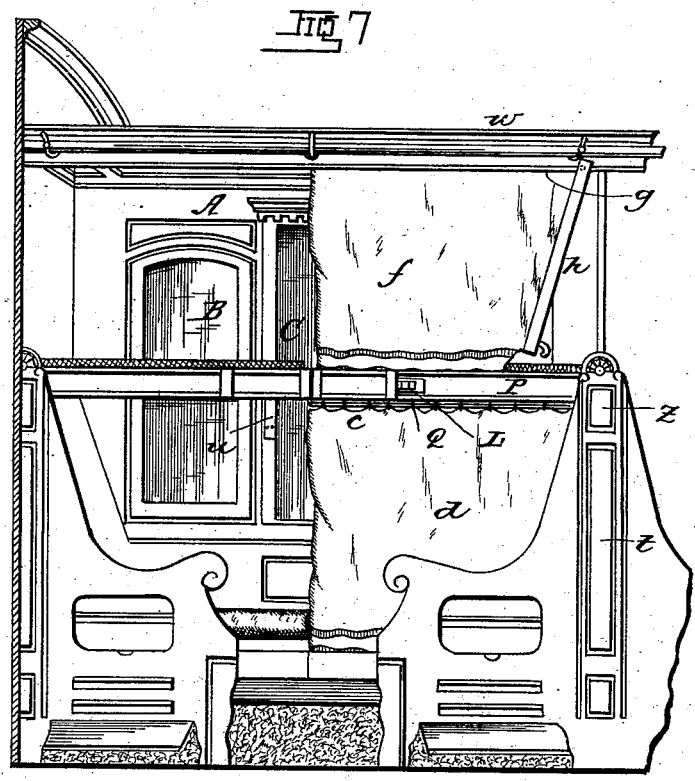
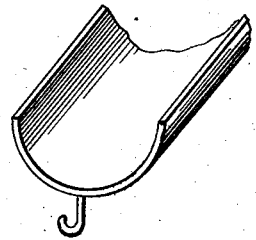
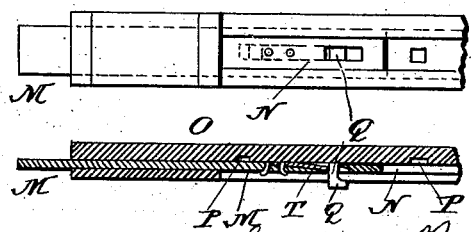
WITNESSES:
INVENTORS
ATTORNEYS.

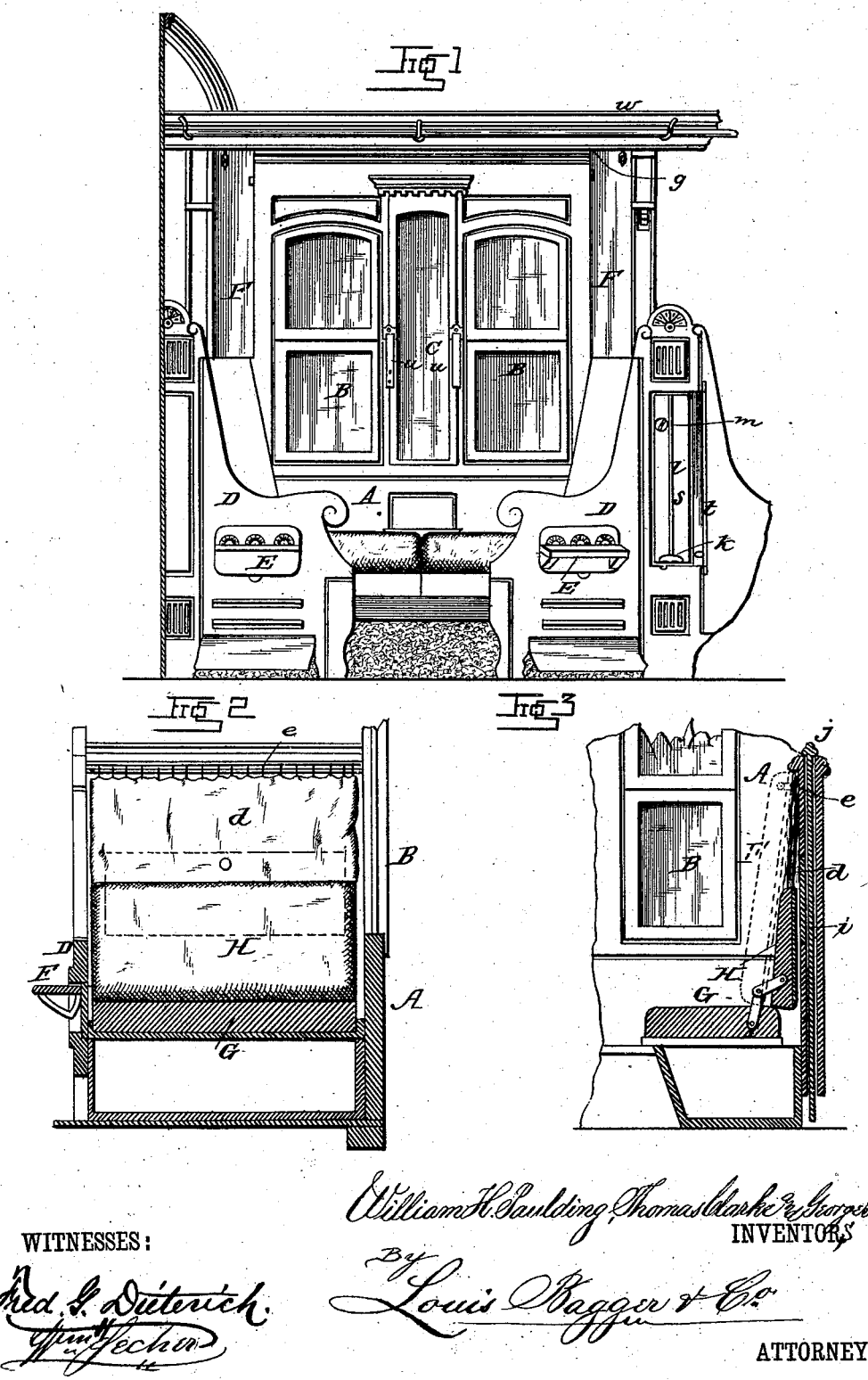

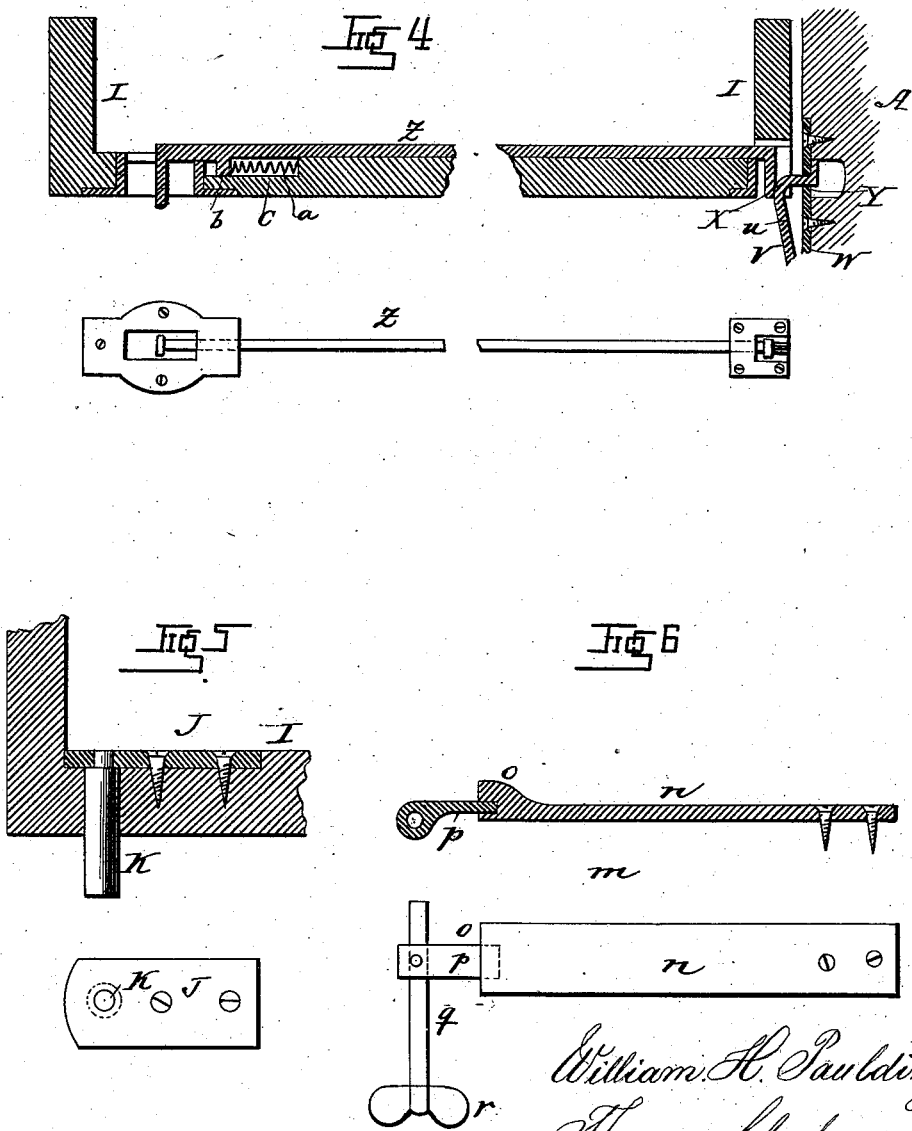

(No Model.) 4 Sheets—Sheet 4.
T. CLARKE, W. H. PAULDING & G. REINL.
SLEEPING CAR.
No. 294,331. Patented Feb. 26, 1884.
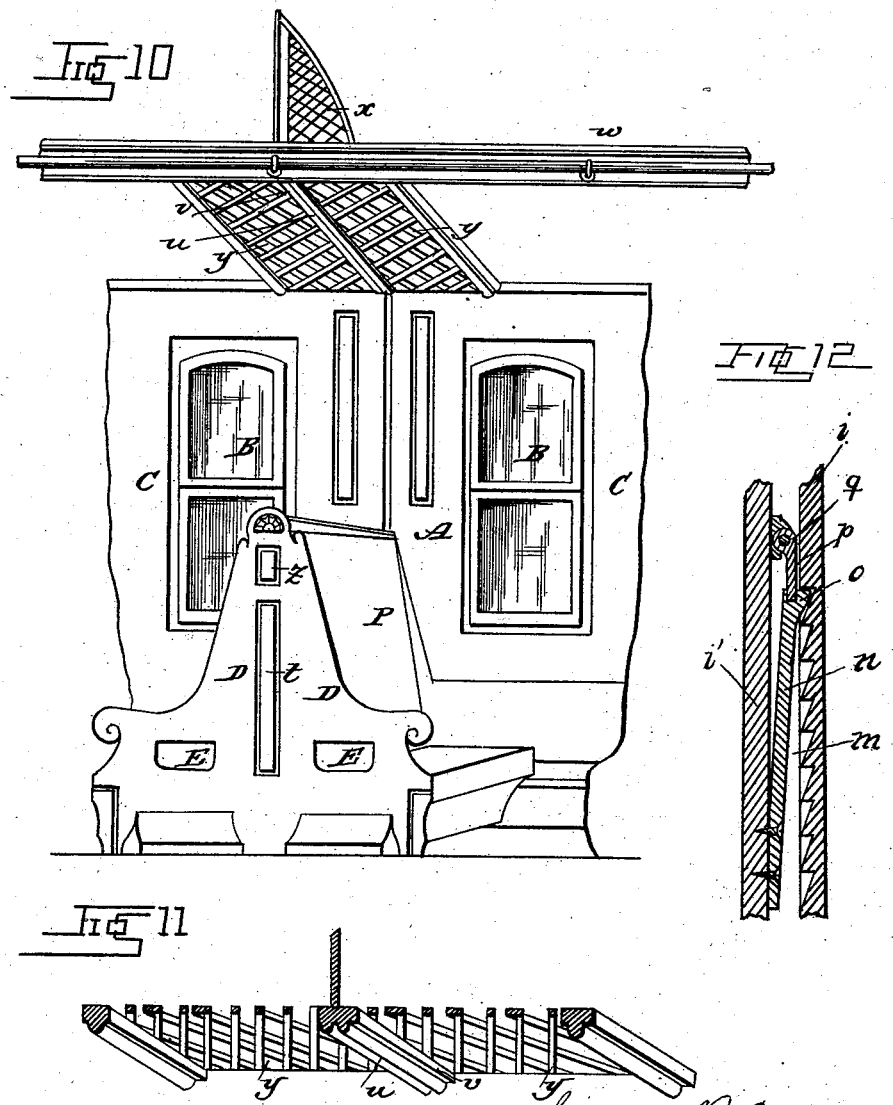

UNITED STATES PATENT OFFICE.

THOMAS CLARKE, OF TRURO, NOVA SCOTIA, CANADA, WILLIAM H. PAULD-
ING, OF PEEKSKILL, AND GEORGE REINL, OF NEW YORK, N. Y.

SLEEPING-CAR.

SPECIFICATION forming part of Letters Patent No. 294,331, dated February 26, 1884.

Application filed June 29, 1882. (No model.)

*To all whom it may concern:*

Be it known that we, THOMAS CLARKE, of Truro, Province of Nova Scotia and Dominion of Canada, WILLIAM H. PAULDING, of Peekskill, in the county of Westchester and State of New York, and GEORGE REINL, of New York, in the county and State of New York, have invented certain new and useful Improvements in Sleeping and Drawing-Room Cars; and we hereby declare that the following is a full, clear, and exact description of the same, which will enable others skilled in the art to which it appertains to make and use the same, reference being had to the accompanying drawings, which form part of this specification, and in which—

Figure 1 is a front view of a section of a car, showing the lower berth in position for use and the leaves forming the bottom of the upper berth thrown upward. Fig. 2 is a longitudinal vertical section of one of the seats with the swinging leaf or back removed. Fig. 3 is a cross-section of the same, showing the swinging back in dotted lines. Fig. 4 shows the bolt and spring supporting the leaves of the upper berth in vertical section and in bottom view. Fig. 5 shows the hinge for the swinging back in longitudinal section and in plan view. Fig. 6 shows similar views of the spring supporting the sliding partition. Fig. 7 is a front view of a section of the car, with the upper and lower berth in position for use, and showing the curtains drawn partly before the berths. Fig. 8 is a perspective detail view of the half-tube or gutter into which the curtain for the upper berth is folded when not in use. Fig. 9 is a plan view and a sectional view of the bolt holding the leaves of the upper berth together. Fig. 10 is a perspective view of two adjoining seats, showing the lattice-work shelves and the screen-partition at the top of the car; and Fig. 11 is a perspective detail view of the said lattice-work shelves, showing the groove in which the upper edge of the sliding partition fits when raised. Fig. 12 is a detail view of the spring-catch which supports the partition.

Similar letters of reference indicate corresponding parts in all the figures.

Our invention has relation to sleeping and drawing-room cars, and it contemplates certain improvements upon the sleeping and drawing-room car for which Letters Patent No. 232,686 were granted to Thomas Clarke on the 28th day of September, 1880; and it consists to that effect in the improved construction and combination of parts of such a car, in which we obtain great durability of construction, superior ventilation, and the perfect privacy for the occupants of the berths, as hereinafter more fully described and claimed.

In the accompanying drawings, the letter A indicates the side of the car, provided with two windows, B B, for each section, having a panel or space between them, as shown at C, which may be ornamented in any suitable manner, or provided with a looking-glass.

D D are the inner seat-supports, which may be suitably ornamented, and which are provided with a folding step, E, for the convenience of the passenger occupying the upper berth, being so constructed that it may be folded out when the passenger desires to step up into the berth, while it may be folded down upon the face of the seat-support when the seats are used in the day-time.

The swinging backs F are hinged at their upper corners between the upper portions of the seat-supports and the side of the car, as will be more fully described, and may be folded up, either in a horizontal position, forming the upper berth, or they may be folded up in a vertical position, forming partitions between the sections of the car, the seat-cushions G having low supplemental backs H, hinged to the frames of the cushions, and forming with them the bottoms of the lower berths. The before-mentioned swinging backs consist of a frame, I, upon which the upholstered cushions are fastened, and the hinges, which are shown in Fig. 5 of the drawings, consist of a plate, J, fastened to the inner side of the upper end of the side pieces of the frame by means of screws or similar means, and a bolt, K, the inner reduced end of which is fastened in the plate, while its outer portion passes through the side piece of the frame into the socket in the upper end of the seat-support, or in the side of the car; and it will be seen that the strain is in this manner taken away from the plate to which the bolt is fastened and divided upon the side piece of the frame and the said plate. The outer side of one of the swinging backs of a section is provided with a sliding bolt, L, which fits with its outer end into a socket in the end of the outer side piece, and which consists of a flat bar, M, sliding in correspondingly-shaped ways N, formed by the plates, which are fastened into the outer side of the swinging back. The inner one, O, of these plates has two or more notches, P, upon its outwardly-facing side, into which notches the inner end of a bolt, Q, engages, the outer end of which projects out through a slot, R, in the plate, forming a head, by which it may be operated, and catch when brought to register with one of the notches. This headed bolt is fastened to the end of a spring, T, fastened to the inner side of the sliding bolt or bar, which spring serves to force the headed bolt into the notches when brought to register with one of them, holding the bolt in place, and the said sliding bolt will support the outer portion of the free ends of the swinging backs or berth-bottoms when they are placed in their horizontal position, holding them together. The inner portions of the ends of the backs are supported by spring-catches U, fastened upon the frame of the panel separating the windows, and shown in detail in Fig. 4, which catches consist of a spring, V, fastened at its lower end to a plate, W, fastened upon the panel-frame, and bent at its upper end to form a projecting shoulder, X, while the bent end passes through a transverse slot, Y, in the plate, and slides in the same, and the inner end of the bent end is bent upward, forming a stop for the end, so as to prevent it from slipping out of the slot. The lower edges of the inner sides of the free ends of the swinging backs rest upon the shoulders of the spring-catches; and to release the said swinging backs, allowing them to be folded down, by pressing the spring-catches back, a sliding rod, Z, slides transversely in the bottom of the frame of the swinging back, near the end of the same, and is bent downward at both ends, the one end bearing against the spring-catch, and the other end, nearest the outer side of the berth or swinging back, projecting through a slot in the bottom of the back frame, and sliding in the same, so that the sliding bar may be pressed against the spring-catch from the outside of the berth. A spiral spring, a, bears against a downwardly-projecting lip, b, upon the sliding bar, and bears against the end of a recess, c, cut into the bottom of the back frame under the sliding bar, thus serving to withdraw the sliding bar when it has been pressed against the spring-catch.

The curtains d for the lower berth are provided with rings at their upper edges, which rings slide upon bars e, hinged by universal joints at the upper corners of the seat-supports, so that the curtains and their rods may be swung out in the night-time, when the berths are used, to extend from the seat-supports to the middle of the berth, where they meet, while in the day-time they may be swung back under the swinging backs out of sight. The upper curtains, f, slide upon rods g at the top of the berth, and during the day-time they are folded up in two semi-tubular gutters, h, each of the length of one-half of the berth, which gutters are hinged at one end to the rod upon which the curtains slide, at the ends of the berth, and may be supported at the other ends at the center of the rod, covering and hiding the curtains.

Between the back panels, i', of each pair of adjoining seats slides a partition, i, the upper edge of which is provided with a rounded flanged molding, j, and the outer edge (which faces toward the aisle of the car) of which is provided with a handle, k, which projects out through a vertical slot, l, in the seat-support, by which handle the partition may be raised, while its lower end is provided with one or more notches, into which a spring-catch, m, fastened to the side of the slot at its upper end, engages when the partition is raised. This spring-catch is shown in Fig. 6, and consists of a flat spring, n, secured at its lower end to the back panel of the one seat, and forming at its upper end a shoulder or offset, o, which engages the notch in the partition, while a short flat bar, p, is fastened to the upper end of the spring, and forms an eye at its upper end, into which the inner end of a bolt, q, is fastened, which bolt turns in a bearing in the seat-support, and is provided with a handle, r, at its outer end. It will be seen that by turning the handle in such a manner that the upper wing of the same will be turned toward the shoulder the flat upper bar will press the upper end of the spring in toward the side of the back panel, withdrawing the catch from engagement with the notch in the partition, and allowing the latter to be lowered when it has been raised. The vertical slot and the handles operating the sliding partition are placed in a recess, s, in the central portion of the seat-support of the two adjoining seats, which recess is closed by a door, t, which may be ornamented, so as to appear as a panel in the seat-support. The upper edge of the partition, with its rounded molding j, fits into a groove, u, in a transverse bar, v, which extends from the side of the car to the rail w, which extends the entire length of the car, at the same distance from the side of the car as the sides of the berths, and to the under side of which the rod upon which the upper curtain slides is fastened. A wire screen or other open-work partition, x, extends between this bar and the top of the car, so that access from one berth or section to another cannot be had, while the open partition admits free circulation of air in the upper portion of the car, carrying all the foul air away.

Two shelves, y, of wire-netting or other open material, extend to both sides from the bar v, for the convenience of the passengers, serving to receive pieces of baggage taken into the car, or other bundles.

It will be seen in this manner that the herein-described construction of the seats and berths will afford all the convenience and comfort desired and increase the privacy of the berths, while it at the same time affords ample ventilation in the car, and provides berths which may be folded down in a moment of time and be again changed to seats in another moment, thus combining compactness and ease of manipulation with the greatest comfort and safety.

If desired, the upper portion, $z$, of the panel over the door $t$ may also be hinged, so that the entire partition may be withdrawn through the slot by opening the door and the hinged panel.

Having thus described our invention, we claim and desire to secure by Letters Patent of the United States—

1. In a sleeping-car, the semi-tubular gutters hinged to the ends of the top bars of the berth, adapted to receive and cover the curtains of the upper berth, and having means for fastening their free ends at the center of the top bar of the berth, as and for the purpose shown and set forth.

2. In a sleeping-car having stationary seat-supports and back panels, the rods hinged to the upper corners of the back panels, near the aisle, having the curtains sliding upon them, and adapted to be swung out, covering the sides of the berth, and to be swung back, covering the back panels of the seat-supports, as and for the purpose shown and set forth.

3. In a swinging back for sleeping-car seats, the hinges for the swinging backs, consisting of the plate fastened upon the inner side of the frame and the bolt fastened with its inner reduced end in the plate, and projecting through the side piece of the frame, beyond the outer side of the same, as and for the purpose shown and set forth.

4. In a sleeping-car, the combination, with the sliding partitions, having a vertical series of notches upon one side, near their outer edge, of the spring-catches, consisting of a flat spring fastened at its lower end upon the inner side of the back panel, forming a shoulder or offset at its upper end, engaging the notches in the sliding partition, and provided with a bar having a transverse eye, fastened into the upper shouldered end, and having a bolt provided with a handle upon its outer end, and turning in horizontal bearings upon the back panel, fastened in the said eye, as and for the purpose shown and set forth.

5. The combination, in a sleeping-car, of the seat-supports, forming a vertically-slotted recess at the point where the seats adjoin, the back panels of the seats, the sliding partition having a handle projecting from the lower end of its outer edge, and having a notch in the lower outer corner of one of its surfaces, the spring-catch, and the hinged door, and the upper hinged panel, as and for the purpose shown and set forth.

6. The combination, in a sleeping-car, of the spring-catches, fastened at their lower ends to the window-frames in the side of the car, sliding horizontally and transversely to the length of the car, with their upper horizontal portions in slots in the same, and engaging under the frame of the swinging backs or upper-berth bottoms, as described, with the rods sliding transversely in the outer ends of the swinging backs, bent downward at one end, bearing against the upper ends of the spring-catches, adapted to push them in, releasing the backs, forming a handle or catch for the fingers, and having a spring keeping the sliding rod away from the spring-catch, as and for the purpose shown and set forth.

THOS. CLARKE.
WM. H. PAULDING.
GEORGE REINL.

In presence of—
WILLIAM G. DAVIS,
M. E. INGERSOLL.